US009906024B2

(12) United States Patent
Mishra et al.

(10) Patent No.: US 9,906,024 B2
(45) Date of Patent: Feb. 27, 2018

(54) POWER MANAGEMENT BETWEEN SOURCES AND LOAD

(71) Applicant: PHILIPS LIGHTING HOLDING B.V., Eindhoven (NL)

(72) Inventors: Priya Ranjan Mishra, Bangalore (IN); Rakeshbabu Panguloori, Bangalore (IN); Vandana Prabhu, Bangalore (IN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 223 days.

(21) Appl. No.: 14/776,289

(22) PCT Filed: Mar. 13, 2014

(86) PCT No.: PCT/IB2014/059712
§ 371 (c)(1),
(2) Date: Sep. 14, 2015

(87) PCT Pub. No.: WO2014/147527
PCT Pub. Date: Sep. 25, 2014

(65) Prior Publication Data
US 2016/0036223 A1    Feb. 4, 2016

Related U.S. Application Data

(60) Provisional application No. 61/804,305, filed on Mar. 22, 2013.

(51) Int. Cl.
*H02J 3/38* (2006.01)
*H02J 1/10* (2006.01)
*H02J 3/46* (2006.01)

(52) U.S. Cl.
CPC ............... *H02J 1/102* (2013.01); *H02J 1/10* (2013.01); *H02J 3/383* (2013.01); *H02J 3/46* (2013.01); *Y02E 10/563* (2013.01)

(58) Field of Classification Search
None
See application file for complete search history.

(56) References Cited

U.S. PATENT DOCUMENTS 7,199,641 B2 * 4/2007 Wei .................. H02M 3/073
                                                    327/293
8,493,020 B2 * 7/2013 Lee .................. H01M 10/465
                                                    307/66

(Continued)

FOREIGN PATENT DOCUMENTS

CN         10240377 A       4/2012
EP          2448086 A1       5/2012
WO       2010143904 A2      10/2012

OTHER PUBLICATIONS

Koizumi, Hirotaka et al "A Novel Maximum Power Point Tracking Method for PV Module Integrated Converter", Proc. 36th Annu. IEEE Power Electron. Spec. Conf., 2005, pp. 2081-2086.

(Continued)

*Primary Examiner* — Jeffrey Zweizig

(57) ABSTRACT

Devices (20) for coupling sources (11, 12) to loads (13) comprise first converters (21) for converting first input signals from first sources (11) into first output signals. The first converters (21) comprise control inputs for receiving control signals. Control values of the control signals define first parameters of the first output signals. Circuits (23) in the devices (20) receive the first output signals and receive second output signals originating from second sources (12) or from second converters (22) coupled to the second sources (12) and provide power signals to the loads (13). The second sources (12) comprise solar panels. Controllers (24) adapt the control values of the control signals in response to detections of changes in second parameters of the first input (Continued)

or output signals. The controllers (24) may operate independently from the second output signals and from second input signals.

12 Claims, 2 Drawing Sheets

(56) References Cited

U.S. PATENT DOCUMENTS

| | | | | |
|---|---|---|---|---|
| 8,680,838 B2* | 3/2014 | Saussele | ............... | G05F 5/00 323/299 |
| 9,048,692 B2* | 6/2015 | Boeke | ............... | H02J 1/102 |
| 2010/0073969 A1 | 3/2010 | Rajagopalan | | |
| 2010/0195361 A1 | 8/2010 | Stem | | |
| 2010/0246233 A1 | 9/2010 | Campbell | | |
| 2011/0273022 A1 | 11/2011 | Dennis | | |
| 2012/0047386 A1* | 2/2012 | Matsui | ............... | H01M 10/465 713/340 |
| 2012/0173031 A1 | 7/2012 | Parameswaran | | |
| 2014/0008986 A1 | 1/2014 | Miyauchi | | |
| 2016/0301215 A1* | 10/2016 | Murano | ............... | H02S 10/00 |

OTHER PUBLICATIONS

Masoum, Mohammad A.S. et al "Theoretical and Experimental Analyses of Photovoltaic Systems with Voltage- and Current-Based Maximum Power-Point Tracking", IEEE Transactions on Energy Conversion, vol. 17, No. 4, Dec. 2002, pp. 514-522.

Xiao, Weidong et al "Topology Study of Photovoltaic Interface for Maximum Power Point Tracking", IEEE Transactions on Industrial Electronics, vol. 54, No. 3, Jun. 2007, pp. 1696-1704.

Teulings, W.J.A. et al "A New Maximum Power Point Tracking System", Proc. 24th Annu. IEEE Power Electron. Spec. Conf., 1993, pp. 833-838.

* cited by examiner

_US 9,906,024 B2_

POWER MANAGEMENT BETWEEN SOURCES AND LOAD

CROSS-REFERENCE TO PRIOR APPLICATIONS

This application is the U.S. National Phase application under 35 U.S.C. § 371 of International Application No. PCT/IB2014/059712, filed on Mar. 13, 2014, which claims the benefit of U.S. Provisional Patent Application No. 61/804,305, filed on Mar. 22, 2013. These applications are hereby incorporated by reference herein.

FIELD OF THE INVENTION

The invention relates to a device for coupling sources to a load. The invention further relates to a system, to a method, to a computer program product and to a medium.

Examples of such a device are power conversion devices, and examples of such a system are sources and loads and parts thereof.

BACKGROUND OF THE INVENTION

US 2012/0173031 A1 discloses a real time power point calibration system. To determine, as disclosed in its abstract, operating points of a photovoltaic array, an amount of power supplied by an alternate power source is adjusted. Thereto, as shown in FIG. 3 and as discussed in paragraph 0084, an indication of a current or a voltage at the photovoltaic array is used to determine whether an output of the photovoltaic array has reached a target current or voltage.

SUMMARY OF THE INVENTION

It is an object of the invention to provide an improved device. It is a further object of the invention to provide a system, an improved method, a computer program product and a medium.

According to a first aspect, a device is provided for coupling sources to a load, the device comprising a first converter for converting a first input signal originating from a first source into a first output signal, the first converter comprising a control input for receiving a control signal, a control value of the control signal defining a first parameter of the first output signal, a circuit for receiving the first output signal and for receiving a second output signal originating from a second source or from a second converter coupled to the second source and for providing a power signal destined for the load, the second source comprising a solar panel, and a controller for in response to a detection of a change in a second parameter of the first input or output signal adapting the control value of the control signal.

A first converter converts a first input signal originating from a first source such as for example a battery or a mains supply into a first output signal. The first converter has a control input for receiving a control signal. A control value of the control signal defines a first parameter of the first output signal. A circuit receives the first output signal and receives either a second output signal originating from a second source or receives a second output signal from a second converter coupled to the second source and provides a power signal to the load. The second source comprises a solar panel.

The device further comprises a controller for adapting the control value of the control signal in response to a detection of a change in a second parameter of the first input or output signal. In other words, contrary to the system in US 2012/0173031 A1 that detects a current or a voltage at the second source (the photovoltaic array) to determine whether an output of the second source has reached a target current or voltage, the improved device detects a change in a second parameter of the first input or output signal, at the input or the output of the first converter. In response to a detection, the control value of the control signal is adapted.

As a result, an improved device has been created, that, compared to the system in US 2012/0173031 A1, no longer needs two disadvantageous sensors at the output of the second source (the photovoltaic array) and no longer needs to concentrate on the second source and no longer needs any calibration, but that concentrates on the first input or output signal. By concentrating on the first converter instead of concentrating on the second source, the complexity is reduced much. These are all great advantages.

The circuit may receive the second output signal from the second source, that may comprise the second converter or not, or from the second converter coupled to the second source. Such a circuit may for example comprise two diodes or two resistors for combining the two output signals into the power signal. Each output signal is to be supplied to one side of its diode/resistor, with the other sides of the diodes/resistors being coupled to each other for providing the power signal. Other kinds of circuits are not to be excluded.

US 2012/0173031 A1 discloses in paragraphs 0036 and 0064 that indications of currents and voltages at the output of the first converter and at the output of the circuit may be used as well. However, these indications are only used for supporting calculations and calibrations performed in response to photovoltaic sensor results. These indications are not used for adapting the control value of the control signal in response to detections of changes in these currents and voltages.

A second source comprising a solar panel is also known as and/or comprises a photovoltaic array and can be any kind of solar-dependent-generator.

An embodiment of the device is defined by the change in the second parameter of the first input or output signal comprising in a first situation an increase of this second parameter and an adaptation of the control value of the control signal then defining the first parameter of the first output signal to be decreased, and the change in the second parameter of the first input or output signal comprising in a second situation a decrease of this second parameter and the adaptation of the control value of the control signal then defining the first parameter of the first output signal to be increased. When the second parameter of the first input or output signal is increased (decreased), the control value of the control signal should define the first parameter of the first output signal to be decreased (increased). So, when the second parameter of the first input or output signal is increased (decreased), the amount of power delivered by the first converter should be decreased (increased). Preferably, by adapting the control value of the control signal, the amount of power supplied via the first converter is minimized.

An embodiment of the device is defined by the adaptation of the control value of the control signal defining the first parameter of the first output signal to be increased in any situation when the second parameter of the first input or output signal is smaller than a threshold value. When the second parameter of the first input or output signal is smaller than a threshold value, the control value of the control signal should define the first parameter of the first output signal to be increased. So, when the second parameter of the first input or output signal is too low/too small, the power delivered via the first converter should be increased.

An embodiment of the device is defined by the first input or output signal comprising a first input or output current signal and the second parameter of the first input or output signal comprising a root mean square value of the first input or output current signal, the control signal comprising a control voltage signal and the control value of the control signal comprising an amplitude of the control voltage signal, and the first output signal comprising a first output voltage signal and the first parameter of the first output signal comprising an amplitude of the first output voltage signal. Preferably, by adapting the first amplitude of the control voltage signal, the amount of power supplied via the first converter is minimized. The power signal is also known as grid signal. Other kinds of signals, parameters and values are not to be excluded.

An embodiment of the device is defined by further comprising a memory for storing the second parameter of the first input or output signal. By storing (a value of) an old, earlier second parameter, by detecting (a value of) a new, present second parameter and by comparing them, the change in (the value of) the second parameter can be detected. The memory may form part of the controller or not.

An embodiment of the device is defined by further comprising a monitor for monitoring the first input or output signal and/or the second parameter of the first input or output signal. By monitoring the first input or output signal and/or the second parameter of the first input or output signal, (the values of) the second parameters can be stored/detected. The monitor may form part of the controller or not.

An embodiment of the device is defined by further comprising the second converter. Such a device can be coupled directly to a second source that itself does not need to comprise the second converter.

An embodiment of the device is defined by the first converter comprising an AC-DC-converter and the first source comprising a mains supply. Preferably, an alternating-current-to-direct-current-converter is used to convert the first input signal into the first output signal. However, other kinds of converters are not to be excluded. For example, for a first source in the form of a battery, a direct-current-to-direct-current-converter might be required.

An embodiment of the device is defined by the second converter comprising a DC-DC-converter for converting a second input signal originating from the second source into the second output signal. Preferably, a direct-current-to-direct-current-converter is used to convert the second input signal into the second output signal. Usually, a second source in the form comprising a solar panel or a photovoltaic array or another kind of solar-dependent-generator will produce a direct-current-signal. However, other kinds of converters are not to be excluded. For example, for a second source that generates an alternating-current-signal, an alternating-current-to-direct-current-converter might be required.

An embodiment of the device is defined by the controller operating independently from the second output signal and/or from the second input signal. Contrary to the system in US 2012/0173031 A1 that detects currents and voltages at the output of the second source (the photovoltaic array) and that detects incoming light entering the second source and that fully depends on these individual signals, the improved device should preferably operate relatively independently from the second output signal and from the second input signal and only use the first input or output signal as a basis for decisions.

An embodiment of the device is defined by the controller adapting the control value of the control signal once per time-interval. Preferably, either the change in the second parameter of the first input or output signal is detected once per time-interval and in response the control value of the control signal is adapted, or the change in the second parameter of the first input or output signal is detected more often and in response the control value of the control signal is adapted once per time-interval. The time-interval may be fixed or flexible.

According to a second aspect, a system is provided comprising the device as defined above and further comprising the second converter and/or the second source and/or the load.

According to a third aspect, a method is provided for a device for coupling sources to a load, the device comprising a first converter for converting a first input signal originating from a first source into a first output signal, the first converter comprising a control input for receiving a control signal, a control value of the control signal defining a first parameter of the first output signal, and the device comprising a circuit for receiving the first output signal and for receiving a second output signal originating from a second source or from a second converter coupled to the second source and for providing a power signal destined for the load, the second source comprising a solar panel, the method comprising a step of adapting the control value of the control signal in response to a detection of a change in a second parameter of the first input or output signal.

According to a fourth aspect, a computer program product is provided for, when run on a computer, performing the step of the method as defined above.

According to a fifth aspect, a medium is provided for storing and comprising the computer program product as defined above.

A basic idea is that a detection of a change in a second parameter of a first input or output signal should be used for adapting a control value of a control signal destined for a first converter coupled to a first source.

A problem to provide an improved device has been solved. A further advantage is that the device is more robust and more efficient and low-cost.

These and other aspects of the invention will be apparent from and elucidated with reference to the embodiments described hereinafter.

DETAILED DESCRIPTION OF EMBODIMENTS

Figure 1:
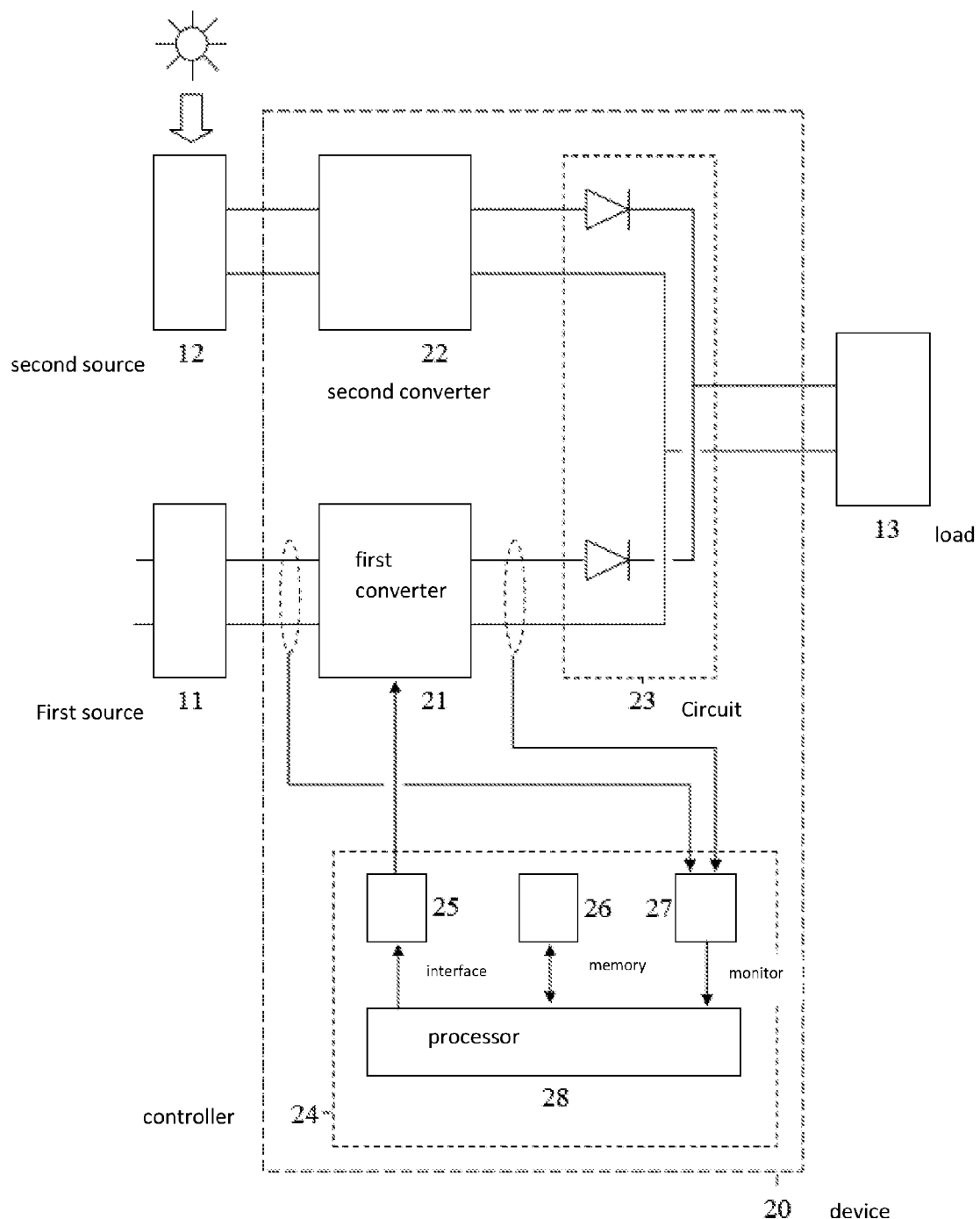
FIG. 1 shows an embodiment of a device.

In the FIG. 1, an embodiment of a device 20 is shown. The device 20 comprises a first converter 21 having inputs coupled to a first source 11 such as a mains supply for receiving a first input signal originating from the first source 11 and having outputs coupled to first inputs of a circuit 23 for providing a first output signal. The first converter 21 comprises a control input for receiving a control signal. A control value of the control signal defines a first parameter of the first output signal. The circuit 23 has second inputs coupled to outputs of a second converter 22 for receiving a second output signal originating from the second source 12. Inputs of the second source 12 are coupled to a second source 12 comprising a solar panel for receiving a second input signal from the second source 12.

Alternatively, the second converter 22 may be left out or may form part of the second source 12, in which case the second inputs of the circuit 23 will be coupled to the second source 12 more directly. The circuit 23 comprises for example two diodes, with their anodes being coupled to the outputs of the converters 21, 22 and with their cathodes being coupled to each other. Alternatively, the circuit 23 may comprise two resistors each one replacing one of the diodes etc. The circuit 23 combines the output signals from the converters 21, 22 and provides a power signal destined for the load 13. In the circuit 23, further circuitry may be present.

The device 20 comprises a controller 24 for in response to a detection of a change in a second parameter of the first input or output signal adapting the control value of the control signal. As also explained at the hand of the flow chart shown in the FIG. 2, in a first situation, the change in the second parameter of the first input or output signal may comprise an increase of this second parameter and an adaptation of the control value of the control signal may then define the first parameter of the first output signal to be decreased. In a second situation, the change in the second parameter of the first input or output signal may comprise a decrease of this second parameter and the adaptation of the control value of the control signal may then define the first parameter of the first output signal to be increased. When the second parameter of the first input or output signal is increased (decreased), the control value of the control signal should define the first parameter of the first output signal to be decreased (increased). So, when the second parameter of the first input or output signal is increased (decreased), the amount of power delivered by the first converter 21 should be decreased (increased). Said adapting of the control value of the control signal is such that the amount of power supplied via the first converter 21 is minimized.

In any situation, the adaptation of the control value of the control signal may define the first parameter of the first output signal to be increased when the second parameter of the first input or output signal is smaller than a threshold value. When the second parameter of the first input or output signal is too low/too small, the power delivered via the first converter 21 should be increased.

As an example only, the first input or output signal may comprise a first input or output current signal and the second parameter of the first input or output signal may comprise a root mean square value of the first input or output current signal. The control signal may comprise a control voltage signal and the control value of the control signal may comprise an amplitude of the control voltage signal. The first output signal may comprise a first output voltage signal and the first parameter of the first output signal may comprise an amplitude of the first output voltage signal.

The controller 24 may further comprise a memory 26 for storing the second parameter of the first input or output signal and/or may further comprise a monitor 27 for monitoring the first input or output signal and/or the second parameter of the first input or output signal. The device 20 may further comprise an interface 25 for providing the control signal to the control input of the first converter 21 and/or may further comprise a processor 28. Alternatively, one or more of the memory 26 and the monitor 27 and the interface 25 may form part of the processor 28, or the processor 28 may form part of one or more of the memory 26 and the monitor 27 and the interface 25. The monitor 27 may for example comprise a current detector and/or a voltage detector and may for example comprise an analog-to-digital-converter. The interface 25 may for example comprise a digital-to-analog-converter. Alternatively, one or more of the memory 26 and the monitor 27 and the interface 25 may be located outside the controller 24.

The first converter 21 may for example comprise an AC-DC-converter and the second converter 22 may for example comprise a DC-DC-converter. The controller 24 in the device 20 preferably operates independently from the second output signal from the second converter 22 and preferably adapts the control value of the control signal once per time-interval. A control input of an AC-DC-converter may for example be a feedback pin also known as FB-pin. The controller 24 adapts the control value of the control signal in response to a detection of a change in a second parameter of the first input signal or in response to a detection of a change in a second parameter of the first output signal or both.

Figure 2:
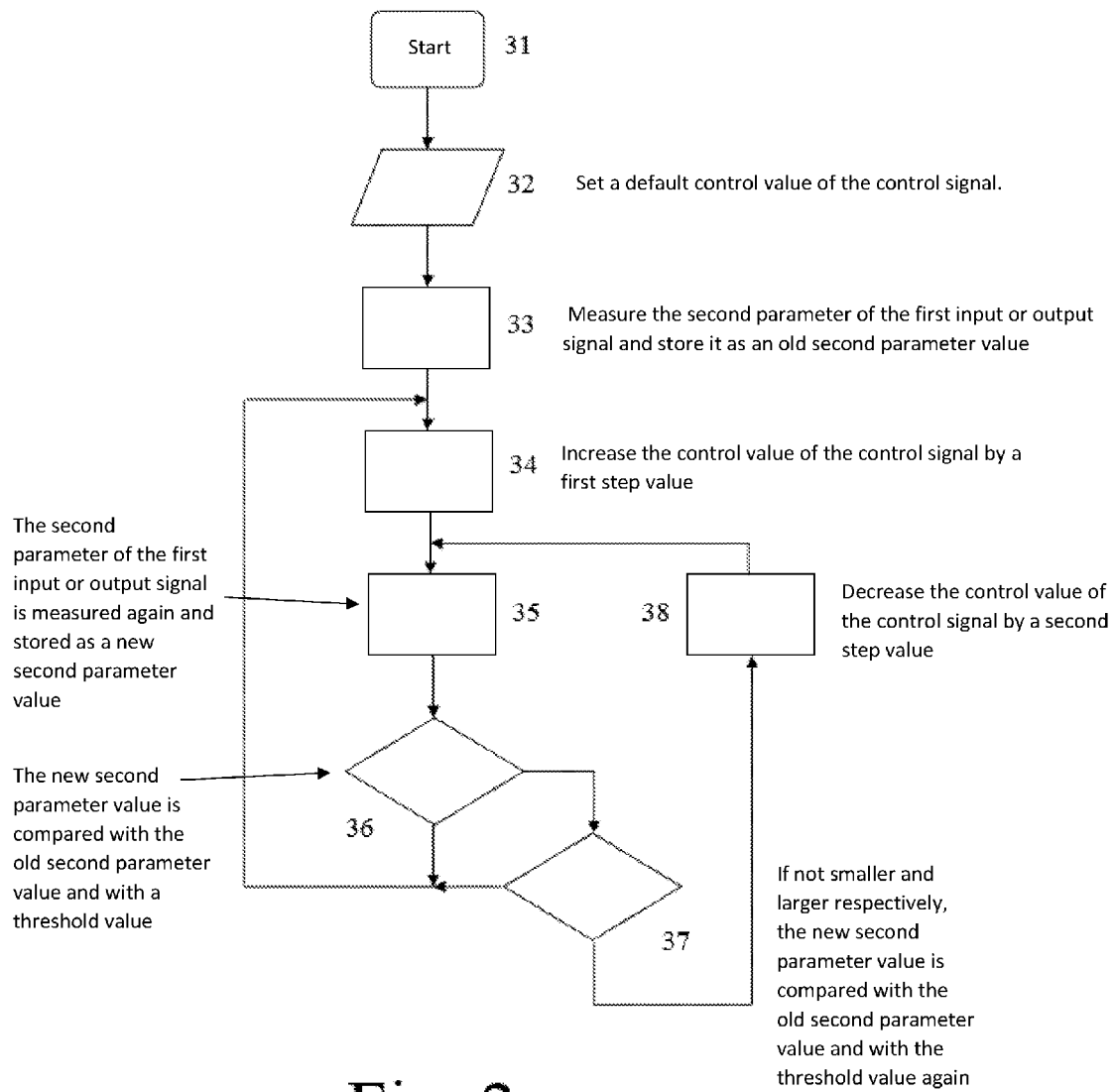
FIG. 2 shows a flow chart.

In the FIG. 2, a flow chart is shown, wherein the following blocks have the following meaning:

Block 31: Start, go to block 32.
Block 32: Set a default control value of the control signal, go to block 33.
Block 33: Measure the second parameter of the first input or output signal and store it as an old second parameter value, go to block 34.
Block 34: Increase the control value of the control signal by a first step value, go to block 35.
Block 35: Measure the second parameter of the first input or output signal and store it as a new second parameter value, go to block 36.
Block 36: Is the new second parameter value smaller than the old second parameter value and is the new second parameter value larger than a threshold value? If yes, give the old second parameter value a value of the new second parameter value and go to block 34. If no, go to block 37.
Block 37: Is the new second parameter value larger than the old second parameter value and is the new second parameter value larger than the threshold value? If yes, give the old second parameter value a value of the new second parameter value and go to block 38. If no, give the old second parameter value a value of the new second parameter value and go to block 34.
Block 38: Decrease the control value of the control signal by a second step value, go to block 35.

So, after a start (block 31), a default control value of the control signal is set (block 32). The second parameter of the first input or output signal is measured and stored as an old second parameter value (block 33). Then the control value of the control signal is increased by a first step value (block 34), and the second parameter of the first input or output signal is measured again and stored as a new second parameter value (block 35). The new second parameter value is compared with the old second parameter value and with a threshold value (block 36), and if smaller and larger respectively, the old second parameter value is given a value of the new second parameter value and the control value of the control signal is increased again by the first step value (block 34) etc. If not smaller and larger respectively, the new second parameter value is compared with the old second parameter value and with the threshold value again (block 37), and if larger and larger respectively, the old second parameter value is given a value of the new second parameter value and the control value of the control signal is decreased by a second step value (block 38) and the second parameter of the first input or output signal is measured again and stored as a new second parameter value (block 35) etc. If not larger and larger respectively, the old second parameter value is given a value of the new second parameter value and the control value of the control signal is increased by the first step value (block 34) etc.

Many alternatives will be possible to this flow chart. For example, the block 36 may be used to only determine whether the new second parameter value is larger than the threshold value. If no, the old second parameter value is given a value of the new second parameter value, and the block 34 is performed again, if yes the block 37 is performed. The block 37 may then be used to determine whether the new second parameter value is larger than the old second parameter value, if yes, the old second parameter value is given a value of the new second parameter value, and the block 38 is performed, if no, the old second parameter value is given a value of the new second parameter value, and the block 34 is performed again etc. The first and second step values may be equal or different and may each have a fixed size or a flexible size.

The device 20 does not maximize an amount of power supplied via the second converter 22 to the load 13 directly, but maximizes the amount of power supplied via the second converter 22 to the load 13 indirectly, by minimizing an amount of power supplied via the first converter 21 to the load 13. The amount of power supplied via the first converter 21 is minimized by regulating the first converter 21 in response to detections of the first input or output signal entering or leaving the first converter 21.

Summarizing, devices 20 for coupling sources 11, 12 to loads 13 comprise first converters 21 for converting first input signals from first sources 11 into first output signals. The first converters 21 comprise control inputs for receiving control signals. Control values of the control signals define first parameters of the first output signals. Circuits 23 in the devices 20 receive the first output signals and receive second output signals originating from second sources 12 or from second converters 22 coupled to the second sources 12 and provide power signals to the loads 13. The second sources 12 comprise solar panels. Controllers 24 adapt the control values of the control signals in response to detections of changes in second parameters of the first input or output signal. The controllers 24 may operate independently from the second output signals and from second input signals.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A device for coupling sources to a load, the device comprising
 a first converter for converting a first input signal originating from a first source into a first output signal, the first converter comprising a control input for receiving a control signal, a control value of the control signal defining a first parameter of the first output signal,
 a circuit for receiving the first output signal and for receiving a second output signal originating from a second source or from a second converter coupled to the second source and for providing a power signal destined for the load, the second source comprising a solar panel,
 a memory for storing the second parameter of the first input or output signal, and
 a controller for in response to a detection of a change in a second parameter of the first input or output signal adapting the control value of the control signal so as to minimize an amount of power supplied via the first converter to the load in order to maximize the amount of power supplied from the second converter.

2. The device as defined in claim 1, the change in the second parameter of the first input or output signal comprising in a first situation an increase of this second parameter and an adaptation of the control value of the control signal then defining the first parameter of the first output signal to be decreased, and the change in the second parameter of the first input or output signal comprising in a second situation a decrease of this second parameter and the adaptation of the control value of the control signal then defining the first parameter of the first output signal to be increased.

3. The device as defined in claim 2, the adaptation of the control value of the control signal defining the first parameter of the first output signal to be increased in any situation when the second parameter of the first input or output signal is smaller than a threshold value.

4. The device as defined in claim 1, the first input or output signal comprising a first input or output current signal and the second parameter of the first input or output signal comprising a root mean square value of the first input or output current signal, the control signal comprising a control voltage signal and the control value of the control signal comprising an amplitude of the control voltage signal, and the first output signal comprising a first output voltage signal and the first parameter of the first output signal comprising an amplitude of the first output voltage signal.

5. The device as defined in claim 1, further comprising
 a monitor for monitoring the first input or output signal and/or the second parameter of the first input or output signal.

6. The device as defined in claim 1, the first converter comprising an AC-DC-converter and the first source comprising a mains supply.

7. The device as defined in claim 1, the second converter comprising a DC-DC-converter for converting a second input signal originating from the second source into the second output signal.

8. The device as defined in claim 7, the controller operating independently from the second output signal and/or from the second input signal.

9. The device as defined in claim 1, the controller adapting the control value of the control signal once per time-interval.

10. A method for a device for coupling sources to a load, the device comprising a first converter for converting a first input signal originating from a first source into a first output signal, the first converter comprising a control input for receiving a control signal, a control value of the control signal defining a first parameter of the first output signal, and the device comprising a circuit for receiving the first output signal and for receiving a second output signal originating from a second source or from a second converter coupled to the second source and for providing a power signal destined for the load, the second source comprising a solar panel, the method comprising a step of:

storing, in a memory, the second parameter of the first input or output signal adapting the control value of the control signal in response to a detection of a change in a second parameter of the first input or output signal so as to minimize an amount of power supplied via the first converter to the load in order to maximize the amount of power supplied from the second converter.

11. A computer program product for, when run on a computer, performing the step of the method as defined in claim 10.

12. A medium for storing and comprising the computer program product as defined in claim 11.

* * * * *